United States Patent Office 3,027,298
Patented Mar. 27, 1962

3,027,298
METHOD OF KILLING INSECTS EMPLOYING N-DIMETHYL NAPHTHYL-CARBAMATE
Henderikus Obias Huisman and Jacques Meltzer, Weesp, Netherlands, assignors, by mesne assignments, to North American Philips Company, Inc., New York, N.Y., a corporation of Delaware
No Drawing. Filed June 3, 1954, Ser. No. 434,348
Claims priority, application Netherlands June 11, 1953
3 Claims. (Cl. 167—32)

It has been found that carbamic acid derivatives of the chemical formula:

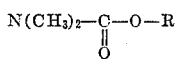

where R represents a phenyl or naphthyl group, generally show an intense insecticide activity and furthermore are not dangerous to man and domestic animals when used in practice.

The said carbamic acid derivatives can be prepared in various manners, for example, in that α-naphthol or β-naphthol is made to react with dimethyl carbamic chloride in the presence of pyridine according to the reaction scheme:

where R again represents a phenyl or naphthyl group.

Among the compounds defined above particularly the N.N.-dimethylphenyl carbamate and the N.N.-dimethyl-α-naphthyl carbamate have come into prominence.

These substances are preferably used in diluted form e.g. mixed with liquids which may be solvents for these substances or with solid carriers.

The first-mentioned substance N.N.-dimethylphenyl carbamate, is distinguished by a distinctly powerful action upon "resistant" flies (the term "resistant" flies is to be understood to mean flies having an increased resistance to the usual insecticides, such as DDT and hexachloro cyclohexane). The N.N.-dimethyl-α-naphthyl carbamate is particularly effective against aphids.

In order to teach the process for the manufacture of these substances a detailed description of the manufacture of N.N.-dimethyl-α-naphthyl carbamates follows.

(1) *Manufacture of Dimethylcarbamylchloride*

This is effected according to the reaction scheme:

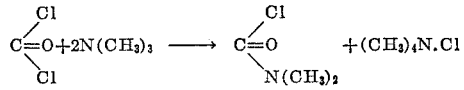

The reaction is carried out, for example, as follows. In a three-necked round-bottomed flask having a capacity of 5 litres and comprising a gas introduction tube and a reflux condenser to which a tube is connected which opens over a concentrated solution of caustic soda 1 litre of dry toluene, is introduced. Into this toluene phosgene is introduced until an increase in weight of 550 gms. is reached, whilst cooling with ice.

Simultaneously in another three-necked round-bottomed flask also having a capacity of 5 litres and containing 955 gms. of trimethylaminehydrochloride a concentrated solution of caustic soda is added drop by drop by means of a dropping funnel. The escaping trimethylamine is introduced via a washing flask containing concentrated caustic soda and a drying element containing solid sodium oxide into a flask also containing 1–1½ litres of dry toluene and dissolved therein whilst cooling with ice. The trimethylamine can also be introduced at a rate of 1 mol per hour; however, it must initially be introduced at a slightly lower rate.

The yield of trimethylamine reckoned with respect to the hydrochloride is 95 to 98% of the theoretical yield.

The solution of trimethylamine is now added drop by drop to the phosgene solution whilst cooling with ice and stirring. Thereupon the mixture is stirred for one hour and the produced (CH₃)₄N.Cl is drawn off. The toluene is distilled at normal pressure and subsequently, also at normal pressure, the dimethylcarbamylchloride. The last-mentioned compound has a boiling point of 165–167° C. The yield is 60 to 70% by weight reckoned with respect to trimethylamine.

(2) *Manufacture of N.N.-Dimethyl-α-Naphthylcarbamate*

This is effected according to the reaction:

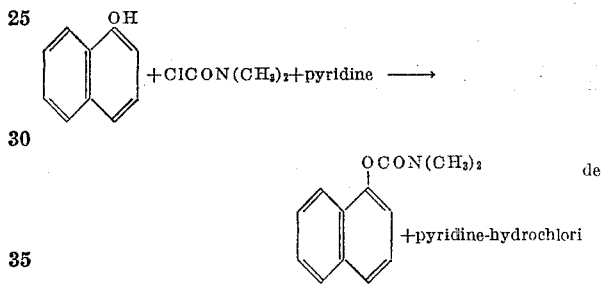

For this purpose one proceeds as follows. Equivalent quantities of α-naphthol, of dimethylcarbamylchloride and dry pyridine (the last-mentioned substance in slight excess) are heated for 2 hours on an oil bath having a temperature of 150° C. in a round-bottomed flask comprising a reflux condenser. When the reaction mixture has cooled, it is treated by shaking with ether and the ethereal solution is washed with water. After separation of the water layer the remainder is washed successively with 2 N-sodium hydroxide and 2 N-hydrochloric acid in order to remove unconverted naphthol and pyridine respectively. The ether layer is subsequently washed with water until a neutral reaction is obtained and dried with sodium sulphate. Then the ether is evaporated and the residue is distilled in vacuo in nitrogen in a flask comprising a wide air cooler, since the distillate crystallizes comparatively rapidly. After evaporation of the dry ether, distillation in nitrogen is preferable to recrystallisation from dry alcohol, since in the last-mentioned case the crystallisation proceeds with difficulty.

The boiling point of the resultant N.N.-dimethyl-α-naphthyl carbamate is 180° C. at a pressure of 5 mms. The melting point is 51–52° C., the yield 71% of the theoretical yield. The colour of the substance is light yellow.

The following description on some experiments made on flies and aphids illustrates the insecticide activity of the compounds obtained by the method according to the invention.

(a) The cover of Petri dishes having a base area of approximately 100 cm.² is treated with a predetermined quantity of the insecticide per cm.². As test objects use was made of flies having a strongly increased resistance to DDT and γ-hexachloro cyclohexane (so-called DDTand Lindaan-resistant flies). The results of these experiments are shown in the following table:

| Product | Conc.,[1] mg./litre | stock [2] | Percentage eliminated after— | | | |
|---|---|---|---|---|---|---|
| | | | 1 h. | 2 h. | 4 h. | 20 h. |
| Lindaan | 10 | L | 98 | 100 | 100 | 100 |
| | | R | 3 | 2 | 8 | 0 |
| DDT | 1,000 | L | 12 | 60 | 55 | 81 |
| | | R | 5 | 8 | 5 | 0 |
| Phenyl-N.N.-di-methyl-carbamate | 1,000 | L | 68 | 98 | 100 | 100 |
| | | R | 37 | 71 | 100 | 100 |

[1] The concentration of 10 mg./litre corresponds to a quantity of 0.15 γ/cm.², that of 100 mg./litre to a quantity of 15 γ/cm.².
[2] L=normal laboratory stock; R=resistant stock Kelding 17 E.

The given "percentage eliminated" is the sum of the percentage of really dead flies and half the percentage of so-called "knock-down." The term "knock-down" is to be understood to mean that the flies are no longer capable of flying and of carrying out coordinated movements. This table shows the extraordinary efficiency of the M-dimethylphenylcarbamate against flies which are not very susceptible to the usual insecticides, such as γ-hexachlorocyclohexane and DDT. Apparently the resistant flies can recover from a poisoning with DDT and Lindaan but not from a poisoning with N.N.-dimethylphenylcarbamate.

(b) When bean plants (*Vicia faba* L.) were dipped in an aqueous emulsion containing 0.1% of N.N.-dimethyl-α-naphthylcarbamate and, after drying, infected with the blackfly (*Aphis fabae* Scop.) 100% of these aphids dies within 24 hours.

What is claimed is:
1. The method of killing insects which comprises distributing a composition containing N-dimethyl, naphthylcarbamate to bring said composition into contact with the insects.
2. The method of claim 1 wherein the N-dimethyl naphthyl carbamate is mixed with a liquid carrier dispersion.
3. The method of claim 1 wherein the N-methyl, naphthyl carbamate is mixed with a solid carrier.

References Cited in the file of this patent
UNITED STATES PATENTS

| | | |
|---|---|---|
| 1,074,966 | Merling et al. | Oct. 7, 1913 |
| 2,592,890 | Gysin | Apr. 15, 1952 |
| 2,677,698 | Deutschman et al. | May 4, 1954 |

FOREIGN PATENTS

| | | |
|---|---|---|
| 666,378 | Great Britain | Feb. 13, 1952 |

OTHER REFERENCES

Immelman et al.: Journal of the South African Institute, vol. II, No. 3 (1949), pages 131–134.

Beilstein, Band 6, page 88 (first supp.) and page 313.

Gatterman, in "Liebigs Ann. Chem." (1887), vol. 244, p. 43.

Gardner et al.: J. Am. Chem. Soc. 69, 3086–8 (1947).